(12) United States Patent
Hsu

(10) Patent No.: US 11,287,902 B2
(45) Date of Patent: Mar. 29, 2022

(54) INPUT DEVICE

(71) Applicants: LITE-ON ELECTRONICS (GUANGZHOU) LIMITED, Guangzhou (CN); Lite-On Technology Corporation, Taipei (TW)

(72) Inventor: Kuo-Hui Hsu, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/929,115

(22) Filed: Jul. 15, 2020

(65) Prior Publication Data

US 2020/0341562 A1 Oct. 29, 2020

Related U.S. Application Data

(63) Continuation-in-part of application No. 16/521,593, filed on Jul. 25, 2019, now Pat. No. 10,747,051.

(60) Provisional application No. 62/712,993, filed on Aug. 1, 2018.

(30) Foreign Application Priority Data

May 20, 2019 (CN) .......................... 201910418060.8

(51) Int. Cl.
 *G06F 3/0338* (2013.01)
 *G06F 3/02* (2006.01)
 *F21V 8/00* (2006.01)

(52) U.S. Cl.
 CPC .......... *G06F 3/0338* (2013.01); *G02B 6/005* (2013.01); *G02B 6/0055* (2013.01); *G06F 3/0202* (2013.01)

(58) Field of Classification Search
 CPC ...... G06F 3/0202; G06F 3/0338; G06F 3/033; H01H 13/83; H01H 2219/044; H01H 2219/062; H01H 2219/064; H01H 2221/07; G02B 6/005; G02B 6/0055
 USPC ..... 362/97.4, 23.03, 23.07, 23.16; 23/21, 22
 See application file for complete search history.

(56) References Cited

U.S. PATENT DOCUMENTS

| | | | | |
|---|---|---|---|---|
| 9,230,754 B2 * | 1/2016 | Liang | ..................... | H01H 13/83 |
| 10,134,543 B2 * | 11/2018 | Lin | ........................ | H01H 13/70 |
| 10,747,051 B2 * | 8/2020 | Hsu | ....................... | G06F 3/0202 |
| 2014/0118989 A1 * | 5/2014 | Chen | ...................... | H01H 13/83 |
| | | | | 362/23.03 |
| 2016/0109636 A1 * | 4/2016 | Weng | ..................... | G02B 6/005 |
| | | | | 362/23.03 |

* cited by examiner

*Primary Examiner* — Laura K Tso
(74) *Attorney, Agent, or Firm* — JCIPRNET

(57) ABSTRACT

An input device includes button structures, a light-emitting member, a base plate and a pointing unit. The light-emitting member is disposed under the button structures. The base plate is disposed between the plurality of button structures and the light-emitting member, wherein the base plate has a body and a first extension portion, and the first extension portion extends from the body toward the light-emitting member. The pointing unit is disposed between the at least two button structures corresponding to the first extension portion, wherein a bottom surface of the first extension portion is level with or protrudes from a bottom surface of the light-emitting member.

19 Claims, 6 Drawing Sheets

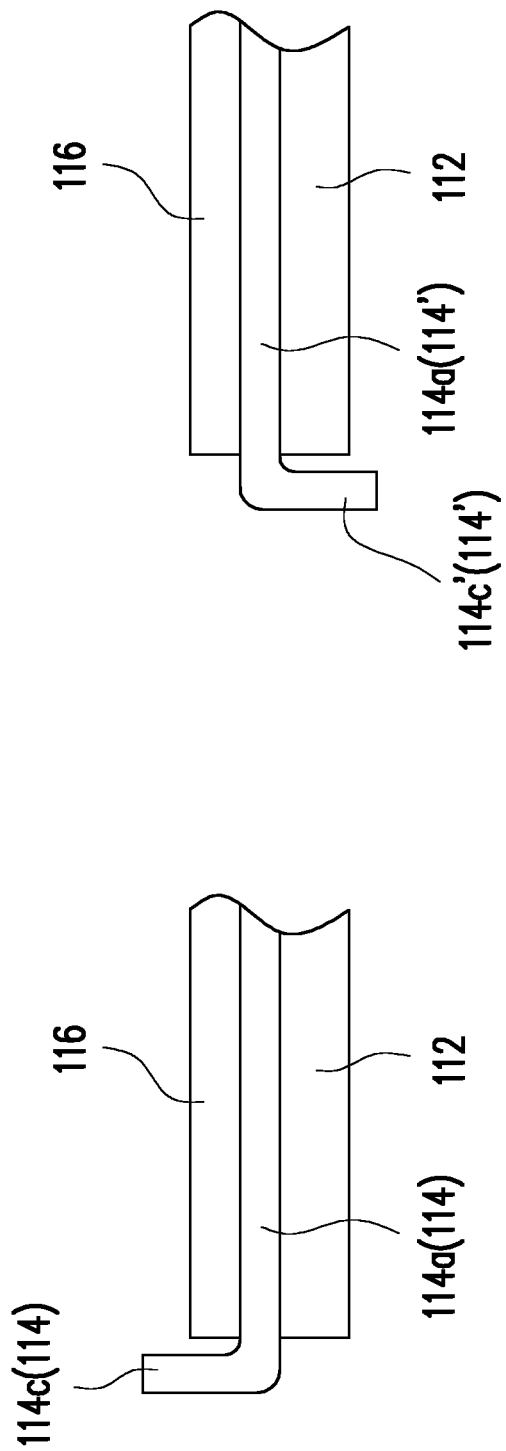

INPUT DEVICE

CROSS-REFERENCE TO RELATED APPLICATION

This application is a continuation-in-part application of and claims the priority benefit of U.S. application Ser. No. 16/521,593, filed on Jul. 25, 2019, now allowed. The prior U.S. application Ser. No. 16/521,593 claims the priority benefits of U.S. provisional application Ser. No. 62/712,993, filed on Aug. 1, 2018, and China application serial no. 201910418060.8, filed on May 20, 2019. The entirety of each of the above-mentioned patent applications is hereby incorporated by reference herein and made a part of this specification.

BACKGROUND OF THE DISCLOSURE

Field of the Disclosure

The disclosure relates to an input device, and in particular to a keyboard with a pointing unit.

Description of Related Art

With the development of technology, many portable electronic devices have been developed, such as notebook computers or personal digital assistants (PDAs) and so on. Users utilize the keyboard, mouse, and other input devices to communicate with the electronic devices.

However, in an environment where the light is insufficient, the user may have difficulty recognizing the numbers and characters marked on the keys of the keyboard, making the operation difficult. Therefore, an illuminated keyboard has been launched, which can widely applied to the backlight module of various electronic devices and thus applied to the keyboard, thereby solving the input problem caused by insufficient ambient light.

On the other hand, for the purpose of convenience, the illuminated keyboard may also be equipped with pointing component such as a touch pad or a pointing stick, so that the user can control the light cursor to move without an external mouse. However, since the pointing unit is to be set, an opening must be provided at the corresponding position of the component of the illuminated keyboard, which may cause light leakage of the backlight module.

SUMMARY OF THE DISCLOSURE

The present disclosure is related to an input device that can mitigate light leakage at a configuration position of a pointing unit.

According to an embodiment of the present disclosure, an input device includes button structures, a light-emitting member, a base plate and a pointing unit. The light-emitting member is disposed under the plurality of button structures. The base plate is disposed between the button structures and the light-emitting member, wherein the base plate has a body and a first extension portion, and the first extension portion extends from the body toward the light-emitting member. The pointing unit is disposed between the at least two button structures corresponding to the first extension portion, wherein a bottom surface of the first extension portion is level with or protrudes from a bottom surface of the light-emitting member.

In an embodiment of the present disclosure, the light-emitting member has a first opening, the base plate has a second opening, the first opening, the second opening and the pointing unit are configured corresponding to each other, and a portion of the base plate is exposed through the first opening of the light-emitting member.

In an embodiment of the present disclosure, the first extension portion is disposed in the first opening of the light-emitting member.

In an embodiment of the present disclosure, the bottom surface of the first extension portion faces toward a central axis of the pointing unit, and is lower than the bottom surface of the light-emitting member.

In an embodiment of the present disclosure, a length of the first extension portion in a direction extending from the body toward the light-emitting member is greater than or equal to a thickness of the light-emitting member.

In an embodiment of the present disclosure, the plurality of button structures includes key caps, a thin-film circuit element and elastic members. The key caps are disposed on the base plate. The thin-film circuit element, disposed between the base plate and the plurality of key caps. The elastic members are respectively disposed between the thin-film circuit element and the plurality of key caps. The connection components are respectively connecting the base plate and the plurality of key caps.

In an embodiment of the present disclosure, the light-emitting member includes a light-shielding layer and a reflecting layer, a light-guide film and a light source. The light-guide film is disposed between the light-shielding layer and the reflecting layer. The light source is disposed on one side of the light-guide film or in an opening of the light-guide film, wherein first extension portion is arranged between a sidewall of the light-guide film and the pointing unit, and the bottom surface of the first extension portion is level with or protrudes from a bottom surface of the reflecting layer.

In an embodiment of the present disclosure, the pointing unit includes a support portion, a sensing portion and an operation portion. The support portion is positioned at a level lower than the body of the base plate. The sensing portion is coupled to the support portion and passing through the light-emitting member. The operation portion is arranged on the sensing portion.

In an embodiment of the present disclosure, the input device further includes a barrier layer corresponding to the support portion, wherein the first extension portion abuts on the barrier layer.

In an embodiment of the present disclosure, the base plate has a second extension portion being connected to an edge of the body and having an included angle of 80° to 100°.

In an embodiment of the present disclosure, an included angle between the body and the first extension portion ranges from 80° to 165°.

According to an embodiment of the present disclosure, an input device includes button structures, a light-emitting member, a base plate and a pointing unit. The light-emitting member is disposed under the plurality of button structures. The base plate is disposed between the plurality of button structures and the light-emitting member, wherein the base plate has a body, a first extension portion and a second extension portion, and the second extension portion separated from the first extension portion extends from an edge of the body. The pointing unit is disposed between the at least two button structures corresponding to the first extension portion, wherein the first extension portion is opaque and surrounds the pointing unit.

In an embodiment of the present disclosure, the light-emitting member has a first opening, the base plate has a second opening corresponding to the first opening and the pointing unit, and the first extension portion is disposed in the first opening of the light-emitting member.

In an embodiment of the present disclosure, a bottom surface of the first extension portion is level with or protrudes from a bottom surface of the light-emitting member.

In an embodiment of the present disclosure, an extending direction of the second extension portion is different from an extending direction of the first extension portion.

In an embodiment of the present disclosure, the first extension portion and the second extension portion extend from the body toward the light-emitting member, and a bottom surface of the second extension portion is level with or protrudes from a bottom surface of the light-emitting member.

In an embodiment of the present disclosure, the plurality of button structures includes key caps, a thin-film circuit element, elastic members and connection components. The key caps are disposed on the base plate, wherein the second extension portion surrounds the key caps. The thin-film circuit element is disposed between the base plate and the plurality of key caps. The elastic members are respectively disposed between the thin-film circuit element and the plurality of key caps. The connection components are respectively connecting the base plate and the plurality of key caps.

In an embodiment of the present disclosure, the light-emitting member includes a light-shielding layer and a reflecting layer, a light-guide film and a light source. The light-guide film is disposed between the light-shielding layer and the reflecting layer. The light source is disposed on one side of the light-guide film or in an opening of the light-guide film, wherein first extension portion covers a sidewall of the light-guide film adjacent to the pointing unit.

In an embodiment of the present disclosure, an included angle between the body and the first extension portion ranges from 80° to 165°.

Based on the above, in the input device and the pointing unit of the present disclosure, by bending a portion of the base plate to form the first extension portion, the sidewall of the light-emitting member exposed by the opening is covered, so that light leakage from the sidewall of the light-emitting member can be mitigated.

BRIEF DESCRIPTION OF THE DRAWINGS

The accompanying drawings are included to provide a further understanding of the disclosure. The accompanying drawings are incorporated into the specification and constitute a part thereof. The accompanying drawings illustrate embodiments of the disclosure and, together with the description, serve to explain the principle of the disclosure.

FIG. 4 is a partial cross-sectional view of FIG. 1.

FIG. 5 is a partial cross-sectional view of an input device according to an embodiment of the present disclosure.

DESCRIPTION OF EMBODIMENTS

Figure 1:
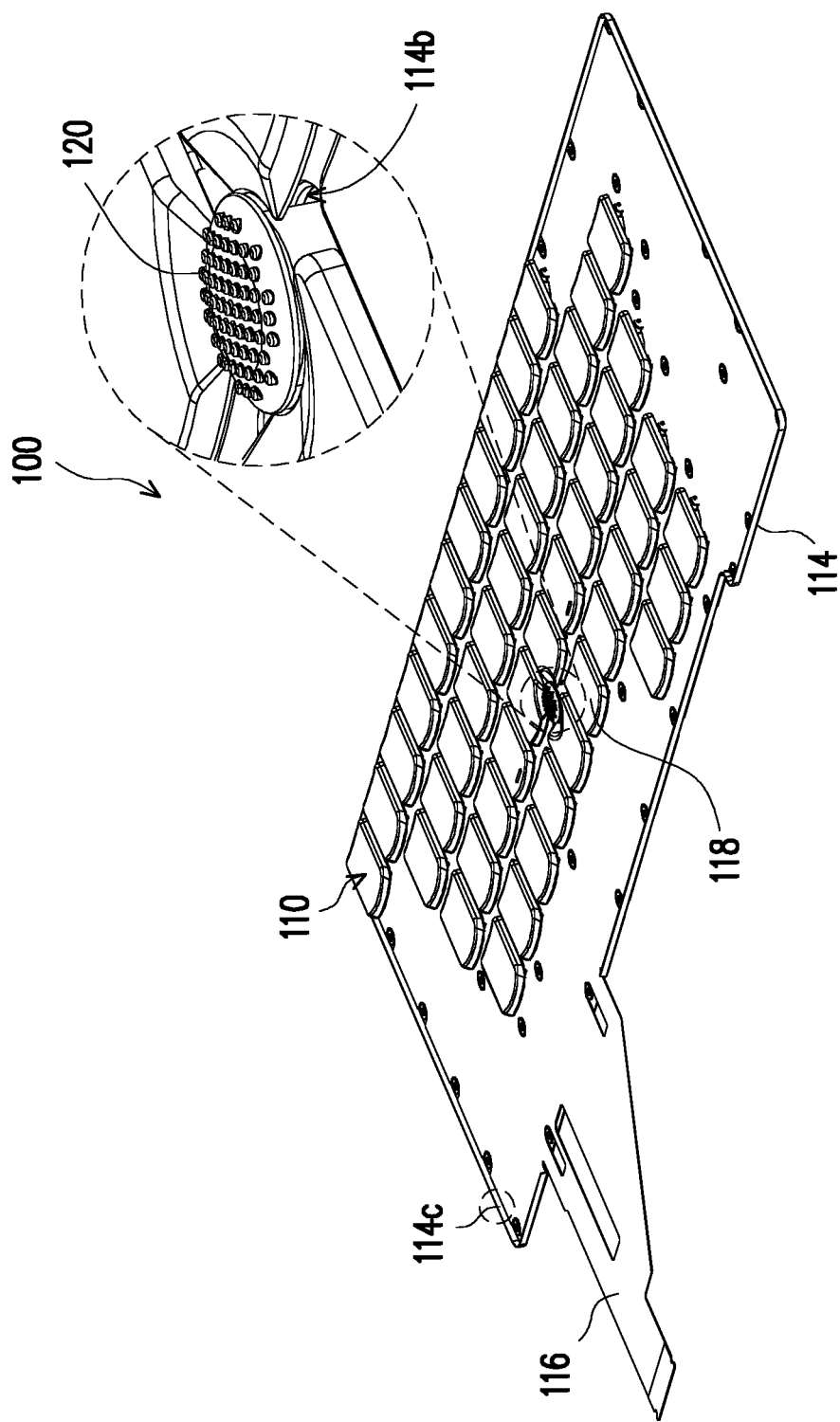
FIG. 1 is a schematic view of an input device according to an embodiment of the present disclosure.

Reference will now be made in detail to the exemplary embodiments of the disclosure. Descriptions of the exemplary embodiments are incorporated in the accompanying drawings. Whenever possible, the same reference symbols are used in the drawings and descriptions to indicate the same or similar parts.

Figure 2:
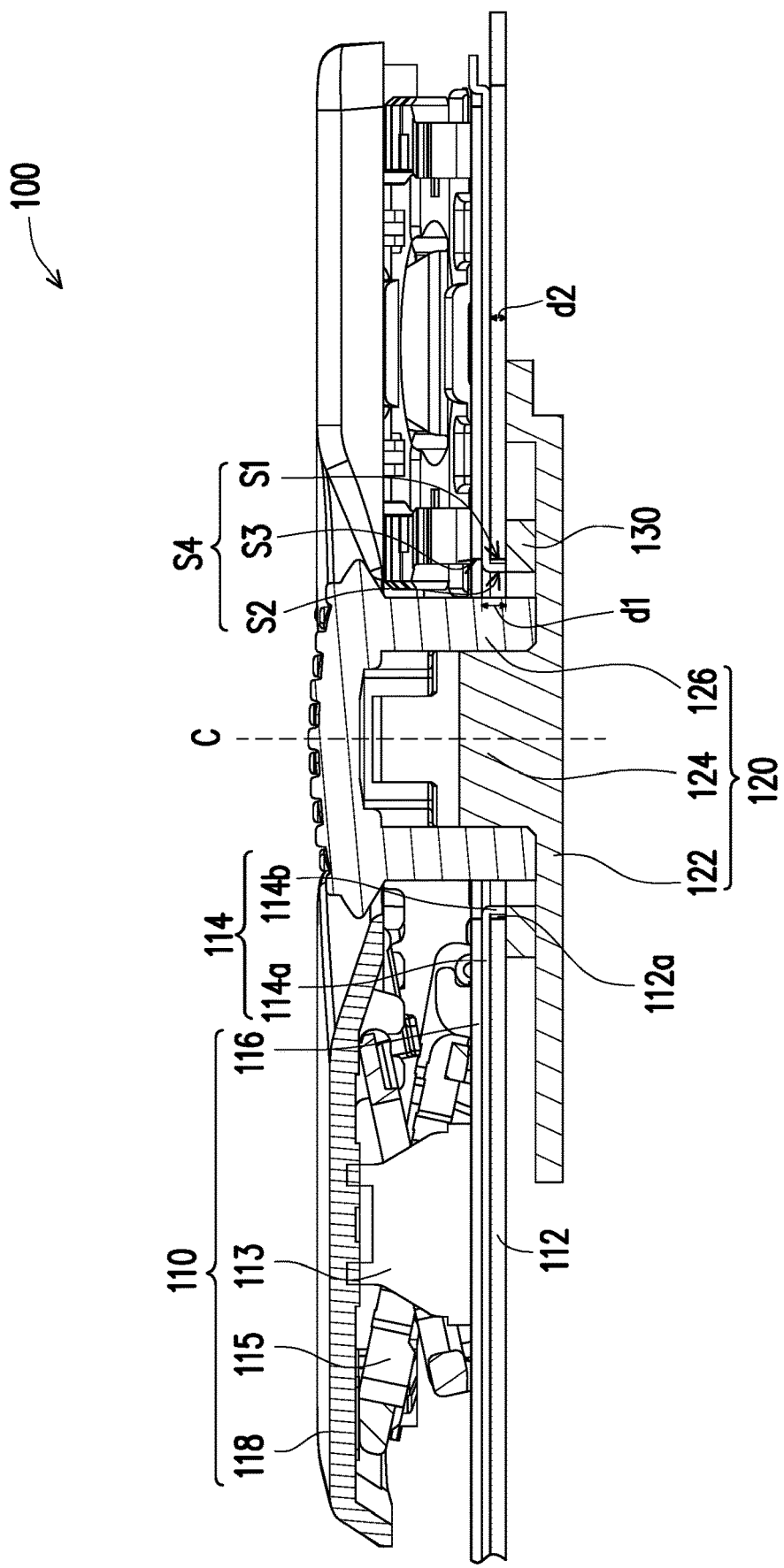
FIG. 2 is a schematic partial cross-sectional view of FIG. 1.
Figure 3:
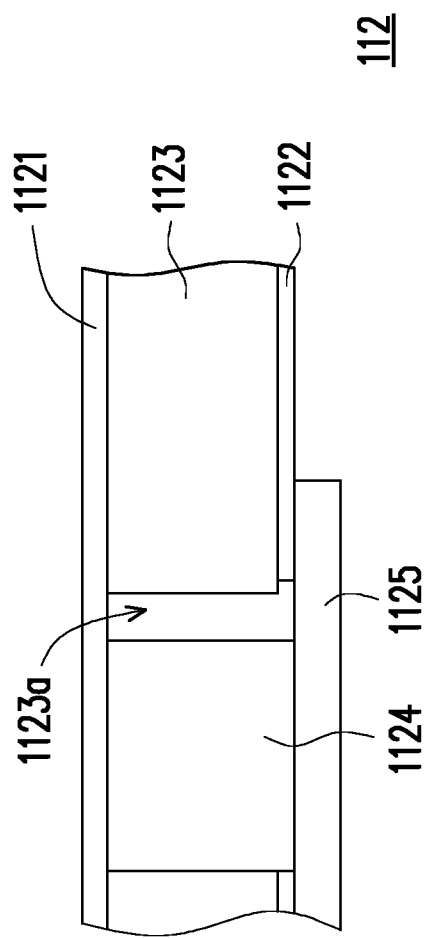
FIG. 3 is a partial enlarged view of a light-emitting member according to an embodiment of the present disclosure.

FIG. 1 is a schematic view of an input device according to an embodiment of the present disclosure. FIG. 2 is a schematic partial cross-sectional view of FIG. 1. FIG. 3 is a partial and enlarged view of a light-emitting member according to an embodiment of the present disclosure. Referring to FIG. 1, FIG. 2 and FIG. 3, an input device 100 of the embodiment is an illuminated keyboard that can be applied to a notebook computer. The input device 100 has a light-emitting member 112, a base plate 114, a plurality of button structures 110, and a pointing unit 120 for users to control or move the cursor easily. The base plate 114 is disposed on the light-emitting member 112, and the button structures 110 are disposed on the base plate 114; that is, the button structures 110 and the light-emitting member 112 are respectively located on two opposite sides of the base plate 114. In an embodiment, the pointing unit 120 can be disposed between at least two button structures 110 and at a position substantially within the central area of the input device 100.

The input device 100 includes the light-emitting member 112, the base plate 114, a thin-film circuit element 116, and a plurality of key caps 118 stacked from the bottom upward. It should be noted that the descriptions regarding orientation or direction are based on the content presented in the drawings and the disclosure, and the descriptions regarding orientation or direction will be changed in accordance with the changed or rotated reference. For example, the button portion of the input device 100 in FIG. 2 includes, from the bottom upwards to the top, the light-emitting member 112, the base plate 114, the thin-film circuit element 116, and the plurality of key caps 118; and when the FIG. 2 is rotated upside down, the input device 100 would include, from the top to the bottom, the light-emitting member 112, the base plate 114, the thin-film circuit element 116, and the plurality of key caps 118.

In addition, the single button structure 110 of the input device 100 includes an elastic member 113 and a connection component 115 both of which are disposed between the thin-film circuit element 116 and the key cap 118. The respective ends of the connection component 115 are movably connected to the base plate 114 and the corresponding key cap 118, thereby supporting the key cap 118 to move up and down with respect to the base plate 114. The connection component 115 is, for example, a scissor-type component including a pair of frames pivotally connected to each other. The elastic member 113 is disposed in a region defined by the connection component 115 and is located within the projection of the key cap 118. The elastic member 113 is, for example, a rubber body, a metal dome or piece, or a spring to provide a restoring force enabling the key cap 118 to restore to the released state.

When the key cap 118 of the input device 100 is pressed, the elastic member 113 is temporarily deformed by the applied force and has a protrusion moved downwards to trigger the switch of the thin-film circuit element 116, thereby enabling thin-film circuit element 116 to generate an input signal. When the force applied to the key cap 118 is removed, the elastic member 113 returns to its original state, and the restoring force thereof drives the key cap 118 to move upwards to the released position.

The light-emitting member 112 can be a backlight module or a luminescent layer, such as a planar sheet with light sources arranged thereon, or an electroluminescence layer (e.g., OLED). In the present embodiment, the light-emitting member 112 of FIG. 3 could be an edge-lit backlighting module that includes a light-shielding layer 1121, a reflecting layer 1122, a light-guide film 1123, and a light source 1124. The light-guide film 1123 is disposed between the light-shielding layer 1121 and the reflecting layer 1122, and the light source 1124 can be a light emitting diode (LED) placed on one side of the light-guide film 1123 or in the opening 1123a of the light-guide film 1123. The light source 1124 could be an SMD-type LED or a chip-scale packaged LED which can be selected according to requirements. In the embodiment shown in FIG. 3, the light-emitting member 112 further includes a circuit board 1125 disposed under the reflecting layer 1122. The circuit board 1125 is, for example, a flexible circuit board and electrically connected to the light source 1124. Once the light emitted from the light source 1124 has entered the light-guide film 1123, the light would be distributed over the interior of the light-guide film 1123 until it is extracted from the light-guide film 1123 and out of the light-emitting member 112, for example, toward the base plate 114. By adding the reflecting layer 1122 underneath the light-guide film 1123, the light that is not totally reflected at the boundary, e.g., the bottom, of the light-guide film 1123 and refracted toward the reflecting layer 1122 can be reflected back inside the light-guide film 1123, thereby minimizing the loss of light and further enhancing uniform luminance over the entire light-emitting member 112. The light-shielding layer 1121 disposed on the light-guide film 1123 has, for example, a translucent or transparent portion and an opaque portion, selectively allowing the light to pass through, such that the light could further pass through openings of the base plate 114 and therefore illuminate the key cap 118 to achieve the back-lighting effect. Meanwhile, certain areas not required to be illuminated, e.g., the gaps between two adjacent key caps 118, could be shaded by the opaque portion to avoid the unwanted light leakage. As depicted in FIG. 2, a first extension portion 114b of the base plate 114 that could block the light leakage at the first opening S1 of the light-emitting member 112 is, for example, arranged between the light-guide film 1123 and the pointing unit 120 to prevent the light from travelling out of the sidewall of the light-guide film 1123 toward the pointing unit 120. That is, the opaque first extension portion 114b might surround the pointing unit 120.

The pointing unit 120 of the input device 100 is, for example, configured to pass through the light-emitting member 112 and the base plate 114, and therefore, through holes (e.g., the first opening S1, the second opening S2 and the third opening S3) are required to be formed respectively in the light-emitting member 112, the base plate 114, and the thin-film circuit element 116. Specifically, the light-emitting member 112 has the first opening S1, the base plate 114 has the second opening S2, and the thin-film circuit element 116 has the third opening S3. In an embodiment, the size (diameter) of the first opening S1 is larger than the size (diameter) of the second opening S2, and the first opening S1, the second opening S2 and the third opening S3 are engaged to form the fourth opening S4, wherein the pointing unit 120 is disposed at a position corresponding the fourth opening S4. A portion of the base plate 114 could be exposed through the first opening S1 of the light-emitting member 112.

Since the pointing unit 120 is disposed in accordance with the position of the first opening S1 and the second opening S2, the base plate 114 in the embodiment is provided with a body 114a and the first extension portion 114b to solve the problem that the light from the light-emitting member 112 is leaked at the position corresponding to the holes or openings. The body 114a is located above the light-emitting member 112, and the first extension portion 114b is integrally connected to the body 114a and extends downwards. In an embodiment, the body 114a may be substantially parallel to the light-emitting member 112, and the first extension portion 114b that could be bent from the body 114a toward the light-emitting member 112. Thus, the first extension portion 114b not only functions as the first sidewall of the second opening S2, but can shield the second sidewall 112a of the light-emitting member 112 exposed by the first opening S1 via further extending the first extension portion 114b into the first opening S1. In the embodiment, the first extension portion 114b is substantially vertical to the body 114a, such that an included angle between the body 114a and the first extension portion 114b is, for example but not limited to, about 90°. The first extension portion 114b has the length d1 extending downward, for example, from the body 114a toward the light-emitting member 112. In an embodiment, the length d1 may be greater than or equal to the thickness d2 of the light-emitting member 112 to achieve a good light-shielding effect. Additionally, the first extension portion 114b may be formed by punching, stamping, and/or bending while processing a sheet metal to form the second opening S2 of the base plate 114.

More specifically, the pointing unit 120 has a support portion 122, a sensing portion 124 coupled to the support portion 122 and protruding upward from the support portion 122, and an operation portion 126 arranged on the sensing portion 124. The sensing portion 124 is disposed in the fourth opening S4, and the light-emitting member 112 is disposed between the support portion 122 and the base plate 114. In addition, the input device 100 includes a barrier layer 130 disposed between the light-emitting member 112 and the support portion 122 of the pointing unit 120, wherein the first extension portion 114b abuts onto the barrier layer 130, or in other embodiments that are not shown, the first extension portion 114b can further abut onto the support portion 122 to completely shield the second sidewall 112a of the light-emitting member 112 adjacent to the sensing portion 124. In this manner, the light leaked from the second sidewall 112a of the light-emitting member 112 could be effectively avoided. Moreover, the barrier layer 130 could be an o-ring or an elastic joint, which prevents moisture or liquid from permeating into the interior through a gap between the support portion 122 and the base plate 114, so that the sensing and operation of the button structures 110 or the pointing unit 120 are not impacted.

It should be noted that, in an embodiment, when the pointing unit 120 is assembled to abut the first extension portion 114b by upwardly passing through the fourth opening S4 from the lower side of the button structures 110, the light leakage could be effectively mitigated by elongating the first extension portion 114b to have the length d1 greater than the thickness d2 of the light-emitting member 112. In this configuration of the pointing unit 120, the support portion 122 is disposed under the light-emitting member 112, the sensing portion 124 passes through the light-emitting member 112 and the base plate 114, and the operation portion 126 is sleeved on the top of the sensing portion 124. The support portion 122, the light-emitting member 112, and the base plate 114 are fixed together by a screw, or the support portion 122 is adhered or attached to the bottom of the light-emitting member 112, such that the pointing unit 120 can be combined with the light-emitting member 112 and the base plate 114.

In other embodiments, the light-emitting member 112, the base plate 114, the support portion 122, the sensing portion 124, and the operation portion 126 can be regarded as a pointing unit without the light leakage, which can be applied to various input devices.

Additionally, FIG. 4 is a partial cross-sectional view of FIG. 1. It is noted that FIG. 4 is the partial cross-sectional view of the dotted line circle at the left side of FIG. 1. Referring to FIGS. 1 and 4, the base plate 114 further has a second extension portion 114c that is connected to the edge of the body 114a and extends opposite to the first extension portion 114b, so as to minimize light leakage from the peripheral side of the input device 100. In an embodiment, the second extension portion 114c could be bent from the body 114a and extend upwards along the outer periphery of the body 114a, while the first extension portion 114b bent from the body 114a extends downwards. The second extension portion 114c is formed by, for example, processing the base plate 114 through stamping and/or bending the sheet metal, so that the second extension portion 114c is integrally connected to the outer edge of the body 114a as a flange. When the input device 100 of the present embodiment is applied to a notebook computer, the second extension portion 114c integrally formed with the body 114a can serve as a positioning structure for assembling the input device 100 into the computer. Furthermore, the liquid entering from the button structures 110 into the input device 100 can be blocked from overflowing out of the second extension portion 114c to affect other electronic components under the base plate 114. An included angle between the second extension portion 114c and the body 114a is, for example, range from 80° to 100°.

FIG. 5 is a partial cross-sectional view of an input device according to an embodiment of the present disclosure. Referring to FIG. 5, in the base plate 114' of the embodiment, the second extension portion 114c' could be bent from the body 114a and extend downwards along the outer periphery of the body 114a. In other words, an extending direction of the second extension portion 114c' may be the same as an extending direction of the first extension portion (e.g., the first extension portion 114b depicted in FIG. 2), so that light leakage from the peripheral side of the light-emitting member 112 can be mitigated. Likewise, an included angle between the body 114a and the second extension portion 114c' could range from 80° to 100°.

Figure 6:
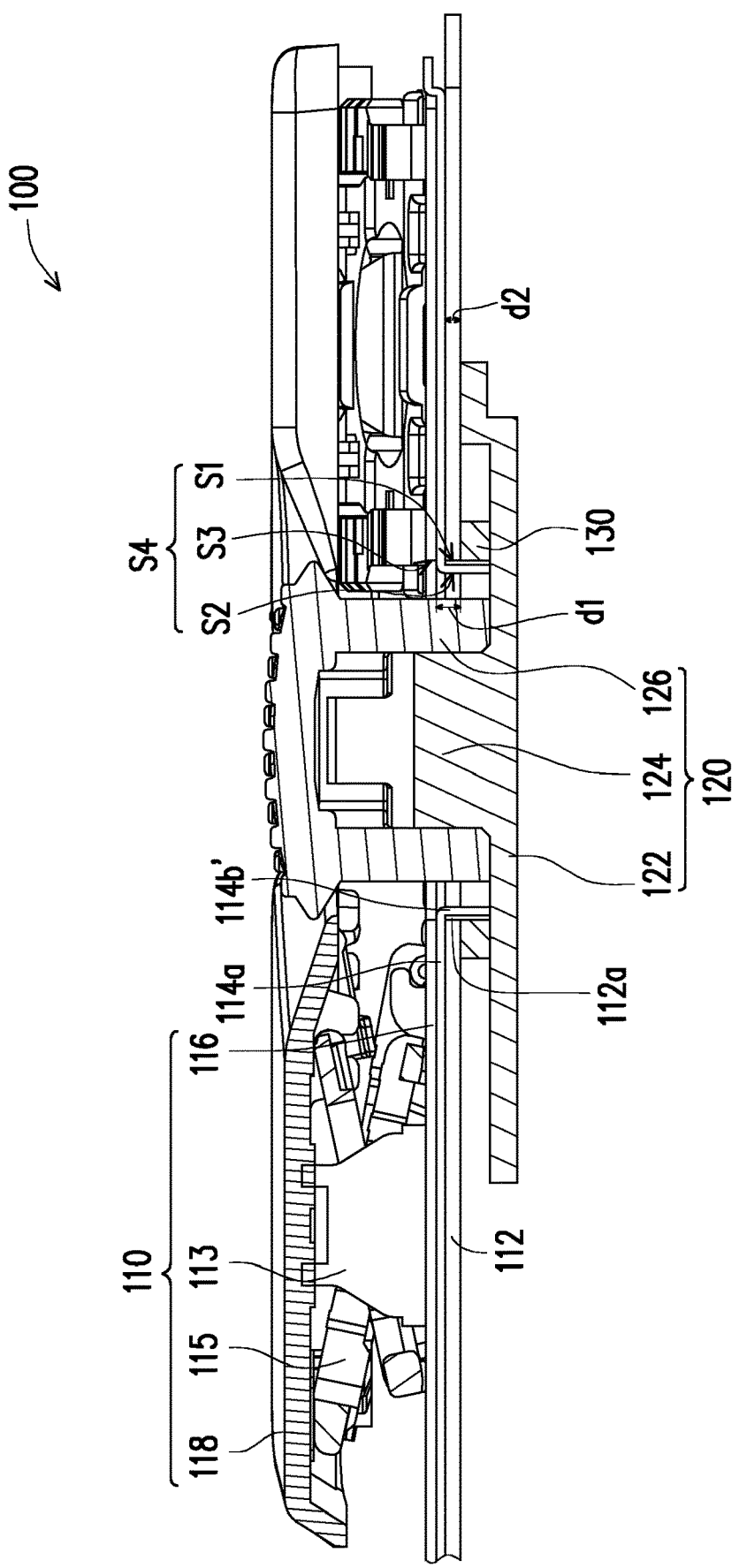
FIG. 6 is a partial cross-sectional view of an input device according to an embodiment of the present disclosure.

FIG. 6 is a partial cross-sectional view of an input device according to an embodiment of the present disclosure. Referring to FIG. 6, the main difference between the embodiment of FIG. 2 and the embodiment of FIG. 6 is mentioned below. In the embodiment of FIG. 2, a bottom surface of the first extension portion 114b is level with a bottom surface of the light-emitting member 112, and the first extension portion 114b abuts onto the barrier layer 130. In the embodiment of FIG. 6, a bottom surface of the first extension portion 114b' protrudes from a bottom surface of the light-emitting member 112, and the first extension portion 114b' abuts onto the support portion 122 that is positioned at a level lower than the body 114a of the base plate 114. With the elongated protrusion, the first extension portion 114b' could further cover the second sidewall 112a of the light-emitting member 112 adjacent to the pointing unit 120, and the length of the first extension portion 114b' might be greater than that of the second sidewall 112a.

Figure 7:
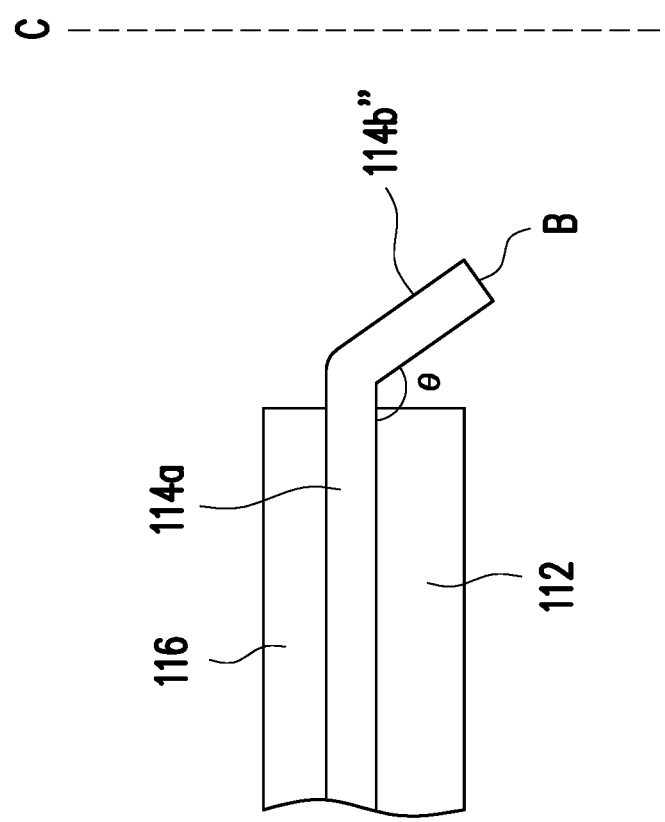
FIG. 7 is a partial cross-sectional view of a light-emitting member, a base plate and a thin-film circuit element according to an embodiment of the present disclosure.

FIG. 7 is a partial cross-sectional view of a light-emitting member, a base plate and a thin-film circuit element according to an embodiment of the present disclosure. Referring to FIG. 7, the first extension portion 114b" is not vertical to the body 114a, so that the light leaked from the sidewall of the light-emitting member 112 could be reflected by the angled first extension portion 114b". In the embodiment, an included angle θ between the body 114a and the first extension portion 114b" is greater than 90°, which is, for example, ranges from 90° to 165°. In this case, the bottom surface B of the first extension portion 114b" could face toward a central axis C of the pointing unit 120 (as shown in FIG. 2). It is noted that, in another embodiment, the body and the first extension portion could be provided with an included angle less than 90°, for example, about 80° to 90°, thereby modifying the reflected light to bounce off the first extension portion at a proper angle.

In summary, in the input device and the pointing unit of the present disclosure, the first extension portion is formed by bending a portion of the base plate, so as to cover the sidewall of the light-emitting member exposed by the opening, thereby mitigating the problem of light leakage at the opening corresponding to the pointing unit.

Finally, it should be noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently replaced; and the modifications or replacement do not depart the nature of corresponding technical solutions from the scope of the technical solutions in the embodiments of the present disclosure.

What is claimed is:

1. An input device, comprising:
a plurality of button structures;
a light-emitting member, disposed under the plurality of button structures;
a base plate, disposed between the plurality of button structures and the light-emitting member, wherein the base plate has a body and a first extension portion, and the first extension portion extends from the body toward the light-emitting member; and
a pointing unit, disposed between the at least two button structures corresponding to the first extension portion, wherein a bottom surface of the first extension portion is level with or protrudes from a bottom surface of the light-emitting member.

2. The input device according to claim 1, wherein the light-emitting member has a first opening, the base plate has a second opening, the first opening, the second opening and the pointing unit are configured corresponding to each other, and a portion of the base plate is exposed through the first opening of the light-emitting member.

3. The input device according to claim 2, wherein the first extension portion is disposed in the first opening of the light-emitting member.

4. The input device according to claim 1, wherein the bottom surface of the first extension portion faces toward a central axis of the pointing unit, and is lower than the bottom surface of the light-emitting member.

5. The input device according to claim 1, wherein a length of the first extension portion in a direction extending from the body toward the light-emitting member is greater than or equal to a thickness of the light-emitting member.

6. The input device according to claim 1, wherein the plurality of button structures comprise:
   a plurality of key caps, disposed on the base plate;
   a thin-film circuit element, disposed between the base plate and the plurality of key caps;
   a plurality of elastic members, respectively disposed between the thin-film circuit element and the plurality of key caps; and
   a plurality of connection components, respectively connecting the base plate and the plurality of key caps.

7. The input device according to claim 1, wherein the light-emitting member comprises:
   a light-shielding layer and a reflecting layer;
   a light-guide film, disposed between the light-shielding layer and the reflecting layer; and
   a light source, disposed on one side of the light-guide film or in an opening of the light-guide film,
   wherein first extension portion is arranged between a sidewall of the light-guide film and the pointing unit, and the bottom surface of the first extension portion is level with or protrudes from a bottom surface of the reflecting layer.

8. The input device according to claim 1, wherein the pointing unit comprises:
   a support portion, positioned at a level lower than the body of the base plate;
   a sensing portion, coupled to the support portion and passing through the light-emitting member; and
   an operation portion, arranged on the sensing portion.

9. The input device according to claim 8, further comprising a barrier layer corresponding to the support portion, wherein the first extension portion abuts on the barrier layer.

10. The input device according to claim 1, wherein the base plate has a second extension portion being connected to an edge of the body and having an included angle of 80° to 100°.

11. The input device according to claim 1, wherein an included angle between the body and the first extension portion ranges from 80° to 165°.

12. An input device, comprising:
   a plurality of button structures;
   a light-emitting member, disposed under the plurality of button structures; and
   a base plate, disposed between the plurality of button structures and the light-emitting member, wherein the base plate has a body, a first extension portion and a second extension portion, and the second extension portion separated from the first extension portion extends from an edge of the body;
   wherein an opening of the base plate is disposed between the at least two button structures corresponding to the first extension portion, wherein the first extension portion is opaque and surrounds the opening of the base plate.

13. The input device according to claim 12, wherein the light-emitting member has an opening, the opening of the base plate is corresponded to the opening of the light-emitting member, and the first extension portion is disposed in the opening of the light-emitting member.

14. The input device according to claim 12, wherein a bottom surface of the first extension portion is level with or protrudes from a bottom surface of the light-emitting member.

15. The input device according to claim 12, wherein an extending direction of the second extension portion is different from an extending direction of the first extension portion.

16. The input device according to claim 12, wherein the first extension portion and the second extension portion extend from the body toward the light-emitting member, and a bottom surface of the second extension portion is level with or protrudes from a bottom surface of the light-emitting member.

17. The input device according to claim 12, wherein the plurality of button structures comprise:
   a plurality of key caps, disposed on the base plate, wherein the second extension portion surrounds the key caps;
   a thin-film circuit element, disposed between the base plate and the plurality of key caps;
   a plurality of elastic members, respectively disposed between the thin-film circuit element and the plurality of key caps; and
   a plurality of connection components, respectively connecting the base plate and the plurality of key caps.

18. The input device according to claim 12, wherein the light-emitting member comprises:
   a light-shielding layer and a reflecting layer;
   a light-guide film, disposed between the light-shielding layer and the reflecting layer; and
   a light source, disposed on one side of the light-guide film or in an opening of the light-guide film,
   wherein first extension portion covers a sidewall of the light-guide film adjacent to the opening of the base plate.

19. The input device according to claim 12, wherein an included angle between the body and the first extension portion ranges from 80° to 165°.

* * * * *